United States Patent
Wang

(10) Patent No.: US 11,107,502 B2
(45) Date of Patent: Aug. 31, 2021

(54) METHOD AND APPARATUS FOR PROCESSING A VIDEO

(71) Applicant: VOLKSWAGEN AKTIENGESELLSCHAFT, Wolfsburg (DE)

(72) Inventor: Muchen Wang, Beijing (CN)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/461,545

(22) PCT Filed: Nov. 22, 2016

(86) PCT No.: PCT/CN2016/106807
§ 371 (c)(1),
(2) Date: May 16, 2019

(87) PCT Pub. No.: WO2018/094573
PCT Pub. Date: May 31, 2018

(65) Prior Publication Data
US 2019/0355392 A1    Nov. 21, 2019

(51) Int. Cl.
*G11B 27/031* (2006.01)
*G11B 27/10* (2006.01)
*H04N 5/265* (2006.01)

(52) U.S. Cl.
CPC .......... *G11B 27/031* (2013.01); *G11B 27/102* (2013.01); *H04N 5/265* (2013.01)

(58) Field of Classification Search
CPC .................................................. G11B 27/031
USPC ........................................................ 386/278
See application file for complete search history.

(56) References Cited

U.S. PATENT DOCUMENTS

| | | | |
|---|---|---|---|
| 5,982,298 A | 11/1999 | Lappenbusch et al. | |
| 8,593,485 B1 | 11/2013 | Anguelov et al. | |
| 2005/0154505 A1 | 7/2005 | Nakamura et al. | |
| 2007/0014536 A1* | 1/2007 | Hellman | G11B 27/034 386/259 |
| 2007/0150188 A1 | 6/2007 | Rosenberg | |
| 2010/0023544 A1 | 1/2010 | Shahraray et al. | |
| 2011/0102367 A1* | 5/2011 | Wang | G06F 3/044 345/174 |
| 2015/0037005 A1* | 2/2015 | Tapper | G11B 27/11 386/241 |
| 2017/0082451 A1 | 3/2017 | Liu et al. | |

FOREIGN PATENT DOCUMENTS

| | | |
|---|---|---|
| CN | 105222802 A | 1/2016 |
| CN | 105657294 A | 6/2016 |
| CN | 105718547 A | 6/2016 |
| DE | 102006056874 A1 | 6/2008 |
| WO | 2006095808 A1 | 9/2006 |

OTHER PUBLICATIONS

Search Report for International Patent Application No. PCT/CN2016/106807; dated Mar. 24, 2017.

* cited by examiner

*Primary Examiner* — Daniel T Tekle
(74) *Attorney, Agent, or Firm* — Barnes & Thornburg LLP

(57) ABSTRACT

A method and an apparatus for processing a virtual reality movie. The method includes acquiring road-related features of road segments of a travel route; and providing at least one video clip matching the road-related features of the road segments of the travel route, as video clips for playing on the road segments.

14 Claims, 4 Drawing Sheets

600

700

800

METHOD AND APPARATUS FOR PROCESSING A VIDEO

PRIORITY CLAIM

This patent application is a U.S. National Phase of International Patent Application No. PCT/CN2016/106807, filed 22 Nov. 2016, the disclosure of which is incorporated herein by reference in its entirety.

SUMMARY

Illustrative embodiments relate to a method and an apparatus for processing a video.

BRIEF DESCRIPTION OF THE DRAWINGS

Disclosed embodiments will become more apparent from the following detailed description made with reference to the accompanying drawings. In the drawings.

DETAILED DESCRIPTION

Figure 1:
FIG. 1 illustrates an architecture diagram of a processing system according to a disclosed embodiment.

Virtual reality (VR) movies are widely used for a variety of purposes, such as exhibitions, remote guidance and touring of places, education, training, electronic games, etc.

Each VR movie includes base plots and a matrix. The matrix of each VR movie may indicate playing interrelation between the base plots of that VR movie. For example, it is assumed that the VR movie includes five base plots B1, B2, B3, B4 and B5, and the matrix of the VR movie may indicate that the base plots B2 and B3 can be played following the base plot B1, the base plot B5 can be played following the base plot B2 and the base plot B4 can be played following the base plot B3. It can thus be determined based on the matrix which base plot(s) may be played following any particular base plot of the VR movie. Each VR movie may be created by composing its bases plots based on its matrix and the user's requirements.

Disclosed embodiments provide a method and an apparatus for processing a video, which can improve video watching experience of a user.

A method for processing a video according to disclosed embodiments may include acquiring road-related feature(s) of road segment(s) of a travel route, and providing at least one video clip matching the road-related feature(s) of corresponding road segment(s) of the travel route, as video clip(s) for playing on the corresponding road segment(s).

The providing of the at least one video clip may include determining, from plurality of video clips, a video clip assigned for playing on at least one corresponding road segment of the travel route, wherein the video clip assigned for playing on the at least one corresponding road segment is one of the plurality of video clips whose story feature and/or background feature more matches the road-related feature of the at least one corresponding road segment compared with other of the plurality of video clips.

The video clip assigned for playing on the at least one corresponding road segment may be at least one video clip that can be played following a video clip assigned for playing on a preceding road segment of the at least one corresponding road segment.

The plurality of video clips may be video clips of a particular movie.

The particular movie may be a movie that is specified by a user.

The method may further include selecting the particular movie front a plurality of movies, wherein a story feature and/or a background feature of the particular movie more matches the road-related feature of the at least one corresponding road segment of the travel route compared with others of the plurality of movies.

The selecting of the particular movie may include calculating a matching value of each of the plurality of movies, which indicates a matching degree of the story feature and/or the background feature of that movie and the road-related feature of the at least one corresponding road segment of the travel route; and searching, from the plurality of movies, a movie with the largest matching value as the particular movie.

The calculating of the matching value of each of the plurality of movies may include computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the story feature and/or the background feature of the certain video clip more matches the road-related feature of the related road segment compared with other video clip of that movie, and computing the matching value of each of the plurality of movies based on the sub-matching values of that movie.

The calculating of the matching value of each of the plurality of movies may include computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the certain video clip is one of at least one video clip of that movie and the story feature and/or the background feature of the certain video clip more matches the road-related feature of the related road segment compared with others of the at least one video clip, and wherein the at least one video clip is video clip(s) that can be played following a video clip used in calculating of the sub-matching value related to a preceding road segment of the related road segment; and computing the matching value of each of the plurality of movies based on the multiple sub-matching values of that movie.

The method may further include causing, upon reaching each of the at least one corresponding road segment of the travel route, the video clip assigned for playing on that road segment to be played.

The method may further include causing a particular subclip of a certain video clip to be played if a particular event occurs during playing of the certain video clip and the particular subclip involves the particular event.

The road-related feature of the travel route may include at least one of a road type of the travel route, a transportation vehicle travel speed of the travel route, a transportation vehicle travel time of the travel route and surroundings of the travel route.

The particular movie may be a virtual reality movie, and the plurality of video clips are base plots of the virtual reality movie.

An apparatus for processing a video according to a disclosed embodiment may include modules for implementing operations included in the method for processing a video.

A device for processing a video according to a disclosed embodiment may include a processor and a memory for storing executable instructions which cause, when executed, the processor to execute operations included in the method for processing a video.

A computer program product according to a disclosed embodiment may include a readable medium having executable instructions for causing, when executed, a machine to execute operations included in the method for processing a video.

A method for making a video according to a disclosed embodiment may include acquiring road-related feature(s) of at least one road segment of a road network; and making at least one video clip set of the video to be selected for playing on corresponding road segment(s) with matched road-related feature(s), wherein each of the at least one video clip set is synthesized respectively by a foreground video clip and each of at least one background video clip corresponding to one of at least one representative road-related feature.

An apparatus for making a video according to a disclosed embodiment may include an acquiring module for acquiring road-related feature(s) of at least one road segment of a road network; and a making module for making at least one video clip set of the video to be selected for playing on corresponding road segment(s) with matched road-related feature(s), wherein each of the at least one video clip set is synthesized respectively by a foreground video clip and each of at least one background video clip corresponding to one of at least one representative road-related feature.

A device for making a video according to a disclosed embodiment may include a processor and a memory for storing executable instructions which cause, when executed, the processor to execute operations included in the method for making a video.

A computer program product according to a disclosed embodiment may include a readable medium having executable instructions for causing, when executed, a machine to execute operations included in the method for making a video.

The above disclosed embodiments provide a video for playing on a travel route by taking into consideration of conditions of the travel route, and thus the user has the feelings of integrating into the video when he/she travels on the travel route and watches the video, which improves video watching experience of the user.

Various embodiments are now described with reference to the drawings, wherein like reference numerals are used to refer to like elements throughout. In the following description, for purposes of explanation, numerous specific details are set forth to provide a thorough understanding of one or more embodiments. However, it may be evident that such embodiments) can be practiced without these specific details.

Disclosed embodiments aim to provide a solution for processing a video, which may provide a video for playing on a travel route by taking into consideration of conditions of the travel route, so that a user has feelings of integrating into the video when he/she travels on the travel route and watches the video and video watching experience of the user is thus improved.

Disclosed embodiments will be below described in details by taking a VR movie as an example of the video.

FIG. 1 illustrates an architecture diagram of a processing system according to a disclosed embodiment. As shown in FIG. 1, the processing system 10 may include a VR device 20 and a control device 30.

The VR device 20 is a device for playing a VR movie. The user may watch the VR movie via the VR device 20.

The control device 30 may connect to a cloud server (not shown) via a wireless or wired communication network to obtain VR movies and navigation map data from the cloud server and store the obtain VR movies and navigation map data in a database. The navigation map data may include at least one of a road type (e.g., curve, ramp, slope, etc.) and surroundings (e.g., high mountain, hill, flatland, ocean, forest, etc.) of each of road segments included in a road network.

The control device 30 may also connect to the cloud server to obtain traffic online information in real time. The traffic online information may include a transportation vehicle travel speed and a transportation vehicle travel time of each of road segments included in the road network. The transportation vehicle travel time of the road segment may indicate a required time for a transportation vehicle to travel from the start point of the road segment to the end point of the road segment.

The control device 30 may also conned to various sensors (e.g., a rain sensor, a vibration sensor, a sound sensor, a temperature sensor and/or a wind sensor, etc.) installed in the transportation vehicle. The control device 30 may use sensor data from these sensors to detect whether a certain event (e.g., deceleration stripes, raining, thundering, snowing, etc.) occurs.

By taking a consideration of conditions of road segments of a travel route the user wants to travel, the control device 30 may obtain a VR movie to be played on the travel route from the VR movies stored in the database and determine a plot assigned for playing on each road segment of the travel route from base plots of the VR movie to be played on the travel route, which will be described in details below.

The control device 30 may also connect to the VR device 20 and provide the plot assigned for each of the road segments of the travel route to the VR device 20 for playing when the user arrives at that road segment.

The control device 30 may be a navigation apparatus, onboard computer or the like installed in the transportation vehicle.

Figure 2:
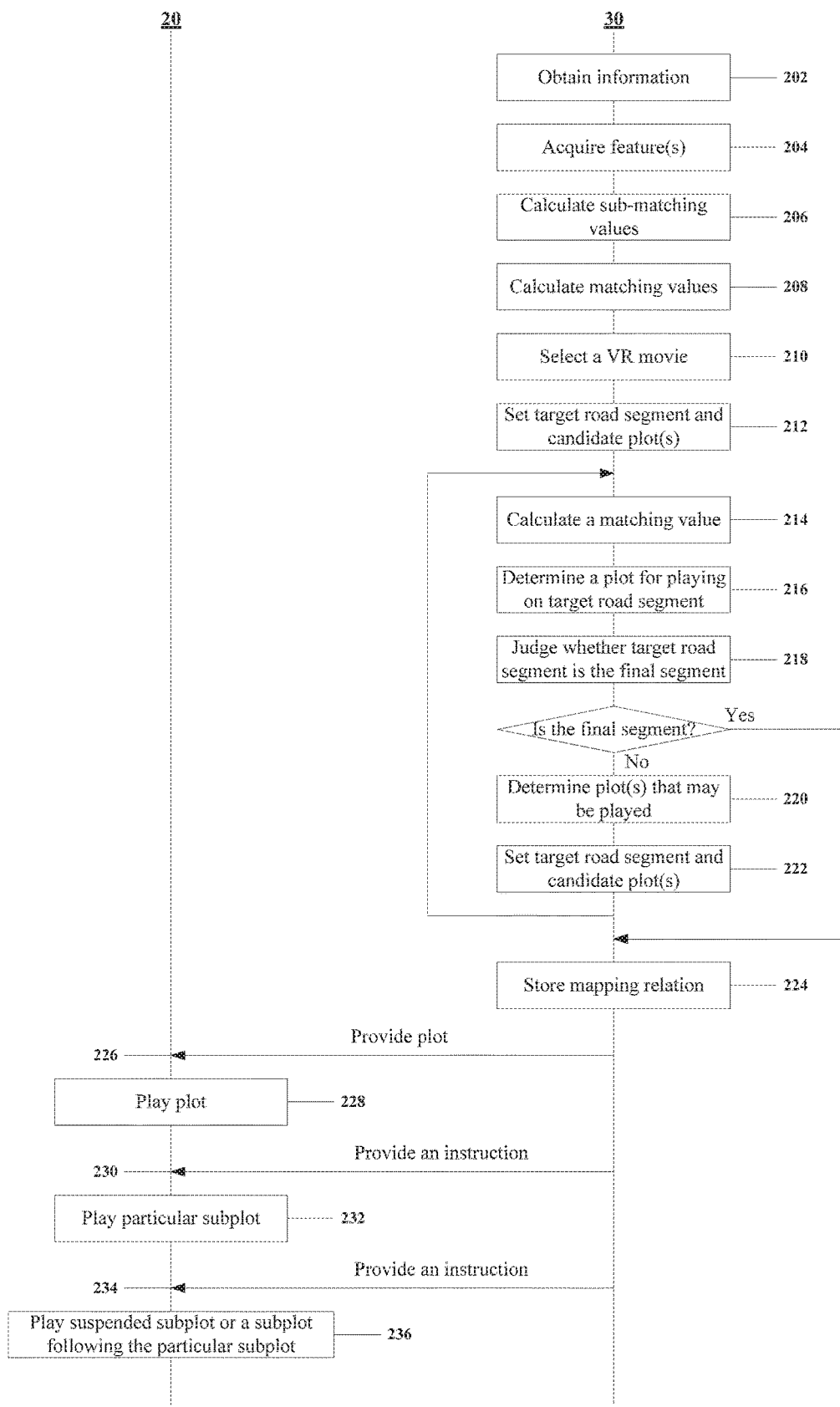
FIG. 2 illustrates a flowchart of a method for processing a video according to a disclosed embodiment.

FIG. 2 illustrates a flowchart of a method for processing a video according to a disclosed embodiment.

As shown in FIG. 2, at Block 202, when the user selects a travel route R he/she wants to travel, the control device 30 may obtain the traffic online information of the travel route R from the cloud server.

At Block 204, the control device 30 may acquire a road-related feature of each of road segments of the travel route R from the navigation map data stored in the database and the obtained traffic online information. For example, the road-related feature of each road segment E of the road segments of the travel route R may include at least one of feature items including a road type (e.g., curve, ramp, slope, etc.) of the road segment E, a transportation vehicle travel speed of the road segment E, a transportation vehicle travel time of the road segment E and surroundings (e.g., high mountain, hill, flatland, ocean, forest, etc.) of the road segment E.

At Block 206, the control device 30 may calculate or compute multiple sub-matching values of each VR movie Gi of the VR movies stored in the database. Wherein each of the multiple sub-matching values of the VR movie Gi is related to one road segment RS of the travel route R and may indicate a matching degree of the road-related feature of the road segment RS and a story feature and/or a background feature of a base plot BP1 of the VR movie Gi, and the story feature and/or the background feature of the base plot BP1 may more match the road-related feature of the road segment RS compared with other base plots of the VR movie Gi. Here, if a plot involves more feature items that are the same as or similar- to the feature items of the road-related feature of a road segment, a matching degree of the story feature and/or the background feature of the plot and the road-related feature of the road segment TR is larger.

At Block 208, the control device 30 may calculate a matching value of the VR movie Gi based on the sub-matching values of the VR movie Gi, to obtain the matching values of the VR movies stored in the database. For example, the matching value of the VR movie Gi may be calculated as a weighted sum of the sub-matching values of the VR movie Gi.

At Block 210, the control device 30 may select a VR movie with the largest matching value from the VR movies stored in the database, as the VR movie to be played on the travel route R. Apparently, the story feature and/or the background feature of the selected VR movie more matches the road-related features of the road segments of the travel route R compared with others of the VR movies stored in the database. For purpose of simplicity, the VR movie selected at Block 208 is referred to as the VR movie V below.

At Block 212, the control device 30 may set the first road segment of the travel route R and all base plots of the VR movie V as a target road segment TR and candidate plot(s) CP respectively.

At Block 214, the control device 30 may calculate a matching value of the road-related feature of the target road segment TR and the story feature and/or the background feature of each plot of the candidate plot(s) CP, which indicates a matching degree of the road-related feature of the target road segment TR and the story feature and/or the background feature of each plot of the candidate pious) CP. Here, if a plot involves more feature items that are the same as or similar to the feature items of the road-related feature of the target road segment TR, a matching degree of the story feature and/or the background feature of the plot and the road-related feature of the target road segment TR is larger.

At Block 216, the control device 30 may determine a plot CT of the candidate plot(s) CP as a plot assigned for playing on the target road segment TR. Wherein, compared with other plot(s) of the candidate plot(s) CP, the matching value of the road-related feature of the target road segment TR and the story feature and/or the background feature of the plot CT is larger.

At Block 218, the control device 30 may judge whether the target road segment TR is the final road segment of the travel route R.

At Block 220, if judgment of Block 218 is negative, the control device 30 may determine, based on the playing interrelation between the base plots of the VR movie that is indicated by the matrix of the VR movie V, plot(s) of the base plots of the VR movie V that can be played following the plot CT.

At Block 222, the control device 30 may set a road segment of the travel route R following the target road segment TR as the target road segment TR and set the plot(s) determined at Block 220 as the candidate plot(s) CP, and the flowchart may then go back to Block 214.

At Block 224, if judgment of Block 218 is confirmative, the control device 30 may store mapping relation between the road segments of the travel route R and the plots assigned for playing on the road segments of the travel route R.

At Block 226, upon reaching each road segment Ki of the travel route R, the control device 30 may provide, based on the stored mapping relation, the plot assigned for playing on the road segment Ki to the VR device 20 for playing.

At Block 228, after receiving the plot assigned for playing on the road segment Ki from the control device 30, the VR device 20 may play the plot assigned for playing on the road segment Ki.

At Block 230, when it is detected based on the sensor data from the sensor installed in the transportation vehicle that a particular event (e.g., deceleration stripes, raining, thundering, snowing, etc.) occurs during playing of a particular plot, and the particular plot includes a particular subplot that involves the particular event, the control device 30 may provide to the VR device 20 an instruction for playing the particular subplot.

At Block 232, after receiving the instruction for playing the particular subplot, the VR device 20 may suspend playing of a currently playing subplot of the particular plot and start to play the particular subplot.

At Block 234, when it is detected that the particular event disappears, the control device 30 may provide an instruction for stopping playing of the particular subplot to the VR device 20.

At Block 236, after receiving the instruction for stopping playing of the particular subplot, the VR device 20 may play the suspended subplot or a subplot following the particular subplot in the particular plot.

It can be seen from the above description that the present disclosed embodiment obtains the VR movie to be played on the travel route and determines the plot assigned for playing on each road segment of the travel route from the base plots of the obtained VR movie by taking the conditions of the road segments of the travel route, and thus the user has the feelings of integrating into the VR movie when watching the VR movie on the travel route, which improves video watching experience of the user.

OTHER MODIFICATION

Those skilled in the art will understand that in the above disclosed embodiment, the method shown in FIG. 2 includes Blocks 230-236 to further improve video watching experience of the user, but the present disclosure is not so limited. In others disclosed embodiments, the method shown in FIG. 2 may not include Blocks 230-236.

Those skilled in the art will understand that in the above disclosed embodiment, the operations of Blocks 202-224 are implemented by the control device 30, but the present disclosure is not so limited. In others disclosed embodiments, the operations of Blocks 202-224 may also be implemented by the cloud server rather than by the control device 30. Under this condition, the cloud server may send to the control device 30 the mapping relation between the road segments of the travel route R and the plots assigned for playing on the road segments of the travel route R and the control device 30 may implement Block 226 or Blocks 226, 228 and 234.

Those skilled in the art will understand that in the above disclosed embodiment, the multiple sub-matching values of each VR movie Gi calculated at Block 206 is related to the road segment RS of the travel route R and may indicate the matching degree of the road-related feature of the road segment RS and the story feature and/or the background feature of the base plot BP1 of the VR movie Gi, and the story feature and/or the background feature of the base plot BP1 may more match the road-related feature of the road segment RS compared with other base plots of the VR movie Gi, but the present disclosure is not so limited. In others disclosed embodiments, the multiple sub-matching values of each VR movie Gi may be related to one road segment TS of the travel route R and may indicate a matching degree of the road-related feature of the related road segment TS and the story feature and/or the background feature of a certain base plot KN of the VR movie Gi, wherein the certain base plot KN is one of at least one base plot of the VR movie Gi and the story feature and/or the background feature of the certain base plot KN more matches the road-related feature of the related road segment TS compared with others of the at least base plot, and wherein the at least one base plot is base plot(s) that can be played following a base plot used in calculating of the sub-matching value related to a preceding road segment of the related road segment TS.

Those skilled in the art will understand that in the above disclosed embodiment, the movie to be played on the travel route R is a VR movie selected from the VR movies stored in the database, but the present disclosure is not so limited. In others disclosed embodiments, the movie to be played on the travel route R may also be a normal movie selected from the normal movies stored in the database. On this condition, video clips assigned for playing on the road segments of the travel route R may be video clips included in the selected normal movie.

Those skilled in the art will understand that in the above disclosed embodiment, the movie to be played on the travel route R is selected from the movies stored in the database, but the present disclosure is not so limited. In others disclosed embodiments, the movie to be played on the travel route R may also be specified by the user according to his/her own preferences.

Those skilled in the art will understand that in the above disclosed embodiment, ail the road segments included in the travel route R are assigned video clips, but the present disclosure is not so limited. In others disclosed embodiments, only one or some of the road segments included in the travel route R are assigned video clips.

Those skilled in the art will understand that in the above disclosed embodiment, the travel route R includes a plurality of road segments, but the present disclosure is not so limited. In others disclosed embodiments, the travel route R may also include one road segment.

Those skilled in the art will understand that in the above disclosed embodiment, the travel route R is definite (i.e., the start point and the destination of the travel route R are known), but the present disclosure is not so limited. In others disclosed embodiments, the travel route R may also be not definite (e.g., the destination of the travel route R is unknown).

Those skilled in the art will understand that in the above disclosed embodiment, the YR device 20 is used as a play device, but the present disclosure is not so limited. In others disclosed embodiments, the play device may be any suitable device with play function.

Figure 3:
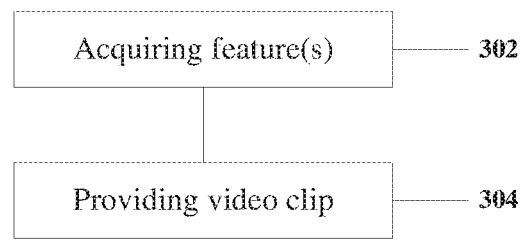
FIG. 3 illustrates a flowchart of a method for processing a video according to a disclosed embodiment.

FIG. 3 illustrates a flowchart of a method for processing a virtual reality movie according to a disclosed embodiment.

As shown in FIG. 3, the method 300 may include, at Block 302, acquiring road-related feature(s) of road segment(s) of a travel route.

The method 300 may also include, at Block 304, providing at least one video clip matching the road-related feature(s) of corresponding road segment(s) of the travel route, as video clip(s) for playing on the corresponding road segment(s). According to the disclosed embodiment, a video clip can be played on at least one corresponding road segment, and a plurality of video clips can be played on one corresponding road segment.

Blocks 302-304 may be implemented, for example, by the control device 30 or the cloud server.

In a first disclosed embodiment, Block 304 may further include determining, from plurality of video clips, a video clip assigned for playing on at least one corresponding road segment of the travel route, wherein the video clip assigned for playing on the at least one corresponding road segment is one of the plurality of video clips whose story feature and/or background feature more matches the road-related feature of the at least corresponding road segment compared with other of the plurality of video clips.

In a second disclosed embodiment, the video clip assigned for playing on the at least one corresponding road segment may be at least one corresponding video clip that can be played following a video clip assigned for playing on a preceding road segment of the at least corresponding road segment.

In a third disclosed embodiment, the plurality of video clips may be video clips of a particular movie.

In a fourth disclosed embodiment, the particular movie may be a movie that is specified by a user.

In a fifth disclosed embodiment, the method 300 may also include selecting the particular movie from a plurality of movies, wherein a story feature and/or a background feature of the particular movie more matches the road-related feature of the at least one corresponding road segment of the travel route compared with others of the plurality of movies.

In a sixth disclosed embodiment, the selecting the particular movie may include: calculating a matching value of each of the plurality of movies, which indicates a matching degree of the story feature and/or the background feature of that movie and the road-related feature of the at least one corresponding road segment of the travel route; and searching, from the plurality of movies, a movie with the largest matching value as the particular movie.

In a seventh disclosed embodiment, the calculating the matching value of each of the plurality of movies may include: computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the story feature and/or the background feature of the certain video clip more matches the road-related feature of the related road segment compared with other video clip of that movie; and computing the matching value of each of the plurality of movies based on the sub-matching values of that movie.

In an eighth disclosed embodiment, the calculating the matching value of each of the plurality of movies may include: computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the certain video clip is one of at least one video clip of that movie and the story feature and/or the background feature of the certain video clip more matches the road-related feature of the related road segment compared with others of the at least one video clip, and wherein the at least one video clip is video clip(s) that can be played following a video clip used in calculating of the sub-matching value related to a preceding road segment of the related road segment; and computing the matching value of each of the plurality of movies based on the multiple sub-matching values of that movie.

In a ninth disclosed embodiment, the method 300 may also include: causing, upon reaching each of the at least one corresponding road segment of the travel route, the video clip assigned for playing on that road segment to be played.

In a tenth disclosed embodiment, the method 300 may also include: causing a particular subclip of a certain video clip to be played if a particular event occurs during playing of the certain video clip and the particular subclip involves the particular event.

In an eleventh disclosed embodiment, the road-related feature of the travel route may include at least one of a road type of the travel route, a transportation vehicle travel speed of the travel route, a transportation vehicle travel time of the travel route and surroundings of the travel route.

In a twelfth disclosed embodiment, the particular movie may be a virtual reality movie, and the plurality of video clips may be base plots of the virtual reality movie.

Figure 4:
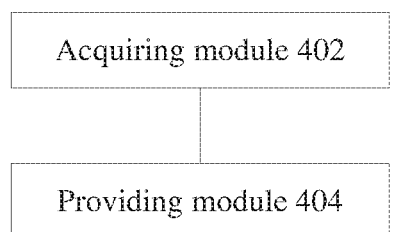
FIG. 4 illustrates a schematic diagram of an apparatus for processing a video according to a disclosed embodiment.

FIG. 4 illustrates a schematic diagram of an apparatus for processing a video according to a disclosed embodiment. The apparatus 400 shown in FIG. 4 may be implemented by software, hardware or combination of software and hardware.

As shown in FIG. 4, the apparatus 400 may include an acquiring module 402 and a providing module 404. The acquiring module 402 may acquire road-related feature(s) of road segment(s) of a travel route. The providing module 404 may provide at least one video clip matching the road-related feature(s) of corresponding road segment(s) of the travel route, as video clip(s) for playing on the corresponding road segment(s). According to the disclosed embodiment, a video clip can be played on at least one corresponding road segment, and a plurality of video clips can be played on one corresponding road segment.

In a first disclosed embodiment, the providing module 404 may include a determining module for determining, from plurality of video clips, a video clip assigned for playing on at least one corresponding road segment of the travel route, wherein the video clip assigned for playing on the at least one corresponding road segment is one of the plurality of video clips whose story feature and/or background feature more matches the road-related feature of the at least corresponding road segment compared with other of the plurality of video clips.

In a second disclosed embodiment, the video clip assigned for playing on the at least one road segment may be at least one video clip that can be played following a video clip assigned for playing on a preceding road segment of the at least one corresponding road segment.

In a third disclosed embodiment, the plurality of video clips may be video clips of a particular movie.

In a fourth disclosed embodiment, the particular movie may be a movie that is specified by a user.

In a fifth disclosed embodiment, the apparatus 400 may also include a selecting module for selecting the particular movie from a plurality of movies, wherein a story feature and/or a background feature of the particular movie more matches the road-related feature of the at least one corresponding road segment of the travel route compared with others of the plurality of movies.

In a sixth disclosed embodiment, the selecting module may include a calculating module for calculating a matching value of each of the plurality of movies, which indicates a matching degree of the story feature and/or the background feature of that movie and the road-related feature of the at least one corresponding road segment of the travel route, and a searching module for searching, from the plurality of movies, a movie with the largest matching value as the particular movie.

In a seventh disclosed embodiment, the calculating module may include: a first computing module for computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the story feature and/or the background feature of the certain video clip more matches the road-related feature of the related road segment compared with other video clip of that movie, and a second computing module for computing the matching value of each of the plurality of movies based on the sub-matching values of that movie.

In an eighth disclosed embodiment, the calculating module may include: a third computing module for computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the certain video clip is one of at least one video clip of that movie and the story feature and/or the background feature of the certain video clip more matches the road-related feature of the related road segment compared with others of the at least one video clip, and wherein the at least one video clip is video clip(s) that can be played following a video clip used in calculating of the sub-matching value related to a preceding road segment of the related road segment; and a fourth computing module for computing the matching value of each of the plurality of movies based on the multiple sub-matching values of that movie.

In a ninth disclosed embodiment, the apparatus 400 may also include a causing module for causing, upon reaching each of the at least one corresponding road segment of the travel route, the video clip assigned for playing on that road segment to be played.

In a tenth disclosed embodiment, the causing module is further configured for causing a particular subclip of a certain video clip to be played if a particular event occurs during playing of the certain video clip and the particular subclip involves the particular event.

In an eleventh disclosed embodiment, the road-related feature of the travel route may include at least one of a road type of the travel route, a transportation vehicle travel speed of the travel route, a transportation vehicle travel time of the travel route and surroundings of the travel route.

In a twelfth disclosed embodiment, the particular movie may be a virtual reality movie, and the plurality of video clips may be base plots of the virtual reality movie.

Figure 5:
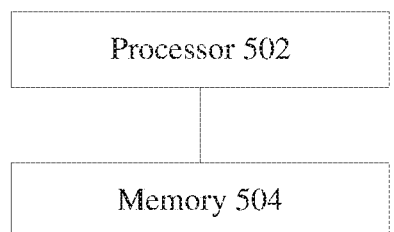
FIG. 5 illustrates a schematic diagram of a device for processing a video according to a disclosed embodiment.

FIG. 5 illustrates a schematic diagram of a device for processing a video according to a disclosed embodiment. As shown in FIG. 5, the device 500 may include a processor 502 and a memory 504. The memory 504 may store executable instructions which cause, when executed, the processor 502 to execute operations included in the method 300 shown in FIG. 3.

Disclosed embodiments may provide a computer program product including a machine-readable medium that comprises codes for causing a machine to execute operations included in the method 300 shown in FIG. 3.

Disclosed embodiments may also provide a solution for making a video, which may create a video clip whose background video clip may correspond to the road-related feature of the road segment.

Figure 6:
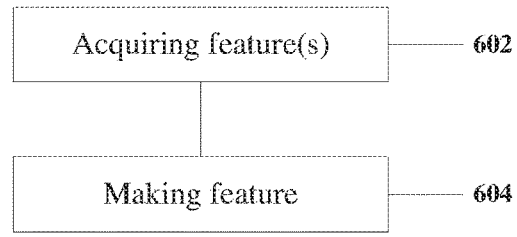
FIG. 6 illustrates a flowchart of a method for making a video according to a disclosed embodiment.

FIG. 6 illustrates a schematic diagram of a method for making a video according to a disclosed embodiment.

As shown in FIG. 6, the method 600 may include, at Block 602, acquiring road-related feature(s) of at least one road segment of a road network.

The method 600 may also include, at Block 604, making at least one video clip set of the video to be selected for playing on corresponding road segment(s) with matched road-related feature(s), wherein each of the at least one video clip set is synthesized respectively by a foreground video clip and each of at least one background video clip corresponding to one of at least one representative road-related feature.

Figure 7:
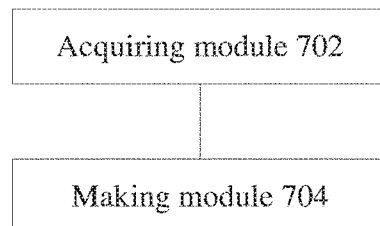
FIG. 7 illustrates a schematic diagram of an apparatus for making a video according to a disclosed embodiment.

FIG. 7 illustrates a schematic diagram of an apparatus for making a video according to a disclosed embodiment. The apparatus 700 shown in FIG. 7 may be implemented by software, hardware or combination of software and hardware.

As shown in FIG. 7, the apparatus 700 may include an acquiring module 702 and a making module 704. The acquiring module 702 is configured for acquiring road-related feature(s) of at least one road segment of a road network. The making module 704 is configured for making at least one video clip set of the video to be selected for playing on corresponding road segment(s) with matched road-related feature(s), wherein each of the at least one video clip set is synthesized respectively by a foreground video clip and each of at least one background video clip corresponding to one of at least one representative road-related feature.

Figure 8:
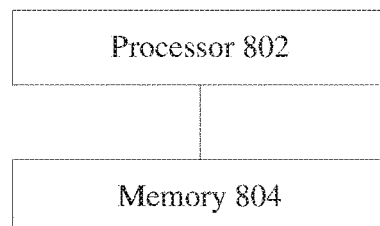
FIG. 8 illustrates a schematic diagram of a device for making a video according to a disclosed embodiment.

FIG. 8 illustrates a schematic diagram of a device for making a video according to a disclosed embodiment. As shown in FIG. 8, the device 800 may include a processor 802 and a memory 804 for storing executable instructions which cause, when executed, the processor 802 to execute operations included in the method 700 shown in FIG. 6.

Disclosed embodiments may provide a computer program product including a machine-readable medium that comprises codes for causing a machine to execute operations included in the method 700 shown in FIG. 6.

Other embodiments and modifications of this disclosure will be apparent to those having ordinary skill in the art upon consideration of the specification and practice of the embodiments disclosed herein. The specification and examples given should be considered exemplary only, and it is contemplated that the appended claims will cover any other such embodiments or modifications as fall within the true scope of the disclosure.

The invention claimed is:

1. A method for processing a video, the method comprising:
   acquiring road-related features, including real time traffic online information, of road segments of a travel route; and
   determining, from plurality of stored video clips, a video clip assigned for playing on at least one corresponding road segment of the travel route, and
   controlling the playing of the assigned video clip via a control device based on the acquired road-related features,
   wherein the video clip assigned for playing on the at least one corresponding road segment is one of the plurality of video clips whose story feature and/or background feature more matches the road-related feature of the at least one corresponding road segment compared with other of the plurality of stored video clips, and
   wherein in response to a sensor detecting an event during the playing of the one of the plurality of video clips, the playing of a subclip is suspended and a new subclip is played that corresponds to the event detected,
   wherein the sensor comprises one or more of a vibration, sound, rain, temperature or wind sensor, or
   wherein the event comprises one or more of deceleration stripes, thundering, snowing, or raining.

2. The method of claim 1, wherein the video clip assigned for playing on the at least one corresponding road segment is at least one video clip that is played following a video clip assigned for playing on a preceding road segment of the at least one corresponding road segment.

3. The method of claim 1, wherein the plurality of video clips is video clips of a particular movie.

4. The method of claim 3, wherein the particular movie is a movie that is specified by a user.

5. The method of claim 3, further comprising selecting the particular movie from a plurality of movies, wherein a story feature and/or a background feature of the particular movie more matches the road-related feature of the at least one corresponding road segment of the travel route compared with others of the plurality of movies.

6. The method of claim 5, wherein the selecting the particular movie comprises:
   calculating a matching value of each of the plurality of movies, which indicates a matching degree of the story feature and/or the background feature of that movie and the road-related feature of the at least one corresponding road segment of the travel route; and
   searching, from the plurality of movies, a movie with the largest matching value as the particular movie.

7. The method of claim 6, wherein the calculating the matching value of each of the plurality of movies comprises:
   computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the story feature and/or the background feature of the certain video clip more matches the road-related feature of the related road segment compared with other video clip of that movie; and computing the matching value of each of the plurality of movies based on the sub-matching values of that movie.

8. The method of claim 6, wherein the calculating the matching value of each of the plurality of movies comprises:
computing, for each of the plurality of movies, multiple sub-matching values of that movie, each of which is related to one of the at least one corresponding road segment of the travel route and indicates a matching degree of the road-related feature of the related road segment and the story feature and/or the background feature of a certain video clip of that movie, wherein the certain video clip is one of at least one video clip of that movie and the story feature and/or the background feature of the certain video clip more matches the road-related feature of the related road segment compared with others of the at least one video clip, and wherein the at least one video clip is video clip(s) that is played following a video clip used in calculating of the sub-matching value related to a preceding road segment of the related road segment; and
computing the matching value of each of the plurality of movies based on the multiple sub-matching values of that movie.

9. The method of claim 3, wherein the particular movie is a virtual reality movie, and the plurality of video clips are base plots of the virtual reality movie.

10. The method of claim 1, further comprising causing, upon reaching each of the at least one corresponding road segment of the travel route, the video clip assigned for playing on that road segment to be played.

11. The method of claim 1, wherein the road-related feature of the travel route comprises at least one of a road type of the travel route, a transportation vehicle travel speed of the travel route, a transportation vehicle travel time of the travel route and surroundings of the travel route.

12. An apparatus for processing a video, the apparatus comprising:
modules for implementing operations included in a method for processing a video, the method comprising:
acquiring road-related features, including real time traffic online information, of road segments of a travel route; and
determining, from plurality of stored video clips, a video clip assigned for playing on at least one corresponding road segment of the travel route, and
controlling the playing of the assigned video clip via a control device based on the acquired road-related features,
wherein the video clip assigned for playing on the at least one corresponding road segment is one of the plurality of video clips whose story feature and/or background feature more matches the road-related feature of the at least one corresponding road segment compared with other of the plurality of stored video clips, and
wherein in response to a sensor detecting an event during the playing of the one of the plurality of video clips, the playing of a subclip is suspended and a new subclip is played that corresponds to the event detected,
wherein the sensor comprises one or more of a vibration, sound, rain, temperature or wind sensor, or
wherein the event comprises one or more of deceleration stripes, thundering, snowing, or raining.

13. A device for processing a video, the device comprising:
a processor; and
a memory for storing executable instructions which cause, when executed, the processor to execute operations included in a method for processing a video, the method comprising:
acquiring road-related features including real time traffic online information, of road segments of a travel route; and
determining, from plurality of stored video clips, a video clip assigned for playing on at least one corresponding road segment of the travel route, and
controlling the playing of the assigned video clip via a control device based on the acquired road-related features,
wherein the video clip assigned for playing on the at least one corresponding road segment is one of the plurality of video clips whose story feature and/or background feature more matches the road-related feature of the at least one corresponding road segment compared with other of the plurality of stored video clips, and
wherein in response to a sensor detecting an event during the playing of the one of the plurality of video clips, the playing of a subclip is suspended and a new subclip is played that corresponds to the event detected,
wherein the sensor comprises one or more of a vibration, sound, rain, temperature or wind sensor, or
wherein the event comprises one or more of deceleration stripes, thundering, snowing, or raining.

14. A computer program product, comprising:
a non-transitory readable medium having executable instructions for causing, when executed, a machine to execute operations included in a method for processing a video, the method comprising:
acquiring road-related features including real time traffic online information, of road segments of a travel route; and
determining, from plurality of stored video clips, a video clip assigned for playing on at least one corresponding road segment of the travel route, and
controlling the playing of the assigned video clip via a control device based on the acquired road-related features,
wherein the video clip assigned for playing on the at least one corresponding road segment is one of the plurality of video clips whose story feature and/or background feature more matches the road-related feature of the at least one corresponding road segment compared with other of the plurality of stored video clips, and
wherein in response to a sensor detecting an event during the playing of the one of the plurality of video clips, the playing of a subclip is suspended and a new subclip is played that corresponds to the event detected,
wherein the sensor comprises one or more of a vibration, sound, rain, temperature or wind sensor, or
wherein the event comprises one or more of deceleration stripes, thundering, snowing, or raining.

\* \* \* \* \*